(12) United States Patent
Demetrius et al.

(10) Patent No.: US 11,912,229 B2
(45) Date of Patent: Feb. 27, 2024

(54) LID FOR AIRBAG TETHER DEPLOYMENT IN VEHICLES

(71) Applicant: Honda Motor Co., Ltd., Tokyo (JP)

(72) Inventors: Carlington G. Demetrius, Dublin, OH (US); Benjamin M. Oros, Dublin, OH (US); Yuichiro Umeda, Novi, MI (US); Akira Miyazaki, Birmingham, MI (US)

(73) Assignee: Honda Motor Co., Ltd., Tokyo (JP)

( * ) Notice: Subject to any disclaimer, the term of this patent is extended or adjusted under 35 U.S.C. 154(b) by 281 days.

(21) Appl. No.: 17/218,133

(22) Filed: Mar. 30, 2021

(65) Prior Publication Data

US 2022/0314922 A1   Oct. 6, 2022

(51) Int. Cl.
*B60R 21/232* (2011.01)
*B60R 21/213* (2011.01)
*B60R 21/215* (2011.01)
*B60R 21/2338* (2011.01)

(52) U.S. Cl.
CPC .......... *B60R 21/232* (2013.01); *B60R 21/213* (2013.01); *B60R 2021/21506* (2013.01); *B60R 2021/23386* (2013.01)

(58) Field of Classification Search
CPC ........ B60R 21/213; B60R 2021/21506; B60R 21/232; B60R 2021/23386
See application file for complete search history.

(56) References Cited

U.S. PATENT DOCUMENTS

| | | | |
|---|---|---|---|
| 6,053,527 A | 4/2000 | Gans et al. | |
| 6,371,512 B1 | 4/2002 | Asano et al. | |
| 6,375,214 B1 | 4/2002 | Nishikaji | |
| 6,808,198 B2 | 10/2004 | Schneider et al. | |
| 6,866,293 B2* | 3/2005 | Ogata | B60R 21/232 280/730.2 |
| 6,913,280 B2* | 7/2005 | Dominissini | B60R 21/213 296/214 |
| 6,948,736 B2 | 9/2005 | DePottey et al. | |
| 7,172,212 B2* | 2/2007 | Aoki | B60R 21/213 280/730.2 |
| 7,654,559 B2* | 2/2010 | Hidaka | B60R 21/213 280/730.2 |
| 8,235,418 B2* | 8/2012 | Slaats | B60R 21/232 280/730.2 |
| 8,414,014 B2 | 4/2013 | Nogami et al. | |
| 8,500,155 B2 | 8/2013 | Enders | |

(Continued)

FOREIGN PATENT DOCUMENTS

| | | |
|---|---|---|
| JP | 2007-196729 A | 8/2007 |
| KR | 100883525 B1 | 2/2009 |

*Primary Examiner* — Jason D Shanske
*Assistant Examiner* — Joselynn Y Sliteris
(74) *Attorney, Agent, or Firm* — Plumsea Law Group, LLC (57) ABSTRACT

A system including an airbag assembly for a vehicle is disclosed. The airbag assembly includes a housing supporting the airbag, an inflation device ("inflator") in fluid communication with the airbag for inflating the airbag from an uninflated position to an inflated position, a tether fixed to the airbag that helps control the deployment and inflation of the airbag, and a tether lid configured to open in order to release the tether during deployment. The tether lid is installed in a pillar garnish of the vehicle, and is opened in response to the force of the tether as it is pulled by the deploying airbag.

20 Claims, 10 Drawing Sheets

(56) References Cited

U.S. PATENT DOCUMENTS

| | | | |
|---|---|---|---|
| 8,505,967 B2* | 8/2013 | Shamoto | B60R 21/213 |
| | | | 280/730.2 |
| 8,936,270 B2 | 1/2015 | Kurahashi | |
| 9,199,600 B2* | 12/2015 | Kawamura | B60R 21/237 |
| 9,669,790 B2 | 6/2017 | Inami | |
| 9,956,935 B2* | 5/2018 | Kawamura | B60R 21/237 |
| 10,434,971 B2* | 10/2019 | Arima | B60R 21/2338 |
| 10,875,485 B2* | 12/2020 | Beltran | F16B 5/128 |
| 2002/0125693 A1* | 9/2002 | Alsup | B60R 21/215 |
| | | | 280/730.2 |
| 2008/0290634 A1 | 11/2008 | Sugimori et al. | |
| 2020/0101918 A1 | 4/2020 | Nagasawa et al. | |

\* cited by examiner

LID FOR AIRBAG TETHER DEPLOYMENT IN VEHICLES

BACKGROUND

The present disclosure generally relates to airbag systems, and more particularly, to vehicle components that facilitate the deployment of airbag systems.

Airbag systems can include airbags installed in multiple locations in a vehicle. For example, frontal airbags are mounted in the steering wheel for the driver, while knee airbags are located in the lower area of the instrument panel. Similarly, vehicles may be equipped with roof rail airbags which are typically located behind the trim covering the roof rails on each side of the vehicle. The inflator can be in different locations within the vehicle, such as above the front seating positions, above or rearward of the B-pillars, on or rearward of the C-pillars, and rearward of the rear seating positions. Some vehicles may include roof rail airbags with two inflators on a side. Despite their widespread use, typical airbag mechanisms have inherent limitations; for example, such systems are designed to accommodate traditional vehicles. However, as vehicle configurations and seating arrangements change, such as with the development of autonomous vehicles, safety systems must be reevaluated and revamped.

There is a need in the art for an airbag deployment system that accommodates non-traditional vehicle seating layouts, in particularly with respect to autonomous vehicles.

SUMMARY

The disclosed embodiments provide methods and systems for a lid and tether arrangement for an airbag system in vehicles.

In one aspect, an inflatable airbag assembly for a vehicle is disclosed. The assembly can comprise a tether and a lid installed in a pillar garnish of a pillar structure of the vehicle. The tether has a first end and a second end, where the first end is attached to a mounting element anchored to an interior surface of the pillar garnish and the second end is attached to an airbag. In addition, the lid is configured to remain spaced apart from the airbag during deployment of the airbag.

Another aspect provides a vehicle comprising a roof rail mounted on a roof of the vehicle. The roof rail includes or houses an airbag. In addition, the vehicle includes a pillar structure oriented along a substantially vertical axis, a pillar garnish mounted on a portion of the pillar structure, a tether connecting the airbag (at a first tether end) to an interior (distal-facing) surface of the pillar garnish (at a second tether end), and a lid installed in the pillar garnish, the lid being configured to open along a first hinge axis adjacent to the second tether end when the airbag is deployed.

Another aspect provides a method of deploying an airbag in a vehicle. The method includes a first step of inflating the airbag, where inflation of the airbag results in a release of the airbag from a storage compartment. A second step includes pulling a tether attached at a first end to the airbag toward a center of the vehicle by the release of the airbag. In addition, a third step includes pushing open a lid installed in a pillar garnish of a pillar by a force exerted by the tether against an inwardly-facing surface of the lid.

Other systems, methods, features, and advantages of the disclosure will be, or will become, apparent to one of ordinary skill in the art upon examination of the following figures and detailed description. It is intended that all such additional systems, methods, features, and advantages be included within this description and this summary, be within the scope of the disclosure, and be protected by the following claims.

BRIEF DESCRIPTION OF THE DRAWINGS

The embodiments can be better understood with reference to the following drawings and description. The components in the figures are not necessarily to scale, emphasis instead being placed upon illustrating the principles of the embodiments. Moreover, in the figures, like reference numerals designate corresponding parts throughout the different views.

DETAILED DESCRIPTION

Vehicles may include a variety of inflatable protective devices or "airbags" that are deployed during an impact to absorb energy during the impact. However, the airbag itself may be understood to comprise only one component of a vehicle occupant-restraint system. The system includes an airbag assembly that can comprise a housing supporting the airbag, an inflation device ("inflator") in fluid communication with the airbag for inflating the airbag from an uninflated position to an inflated position, and a tether fixed to the airbag that helps control the deployment and inflation of the airbag. In the case of roof rail airbags, the airbag structure may be stowed along the roof of the vehicle in a roof rail compartment. Such airbags are configured to inflate from the roof of the vehicle and unfurl downward (e.g., across the window glass) inside the passenger compartment in a manner similar to an inflatable curtain. This may occur for example in the event of a side impact or a vehicle rollover. The inflation of the airbag by pressurized gas enables the downward unfurling of the airbag. However, portions of some airbags can deploy to a position that is undesirable, such as outboard of the vehicle beltline. In order to prevent this, airbags can include tethers that control the deployment of the roof rail airbag, and can guide the airbag against ineffectual or unsafe movements.

However, vehicle occupant-restraint systems do not necessarily provide the desired level of safety in an accident because current standards for seats, seat belts and airbags are based on passengers sitting in an upright position and facing forward. Vehicles are increasingly developing modifications in passenger seating arrangements. Autonomous driving aims to reduce or completely eliminate a human driver's role in driving a vehicle in order to drastically reduce accidents. Some vehicles, such as those featuring Society of Automotive Engineers (SAE) Level 3+ automated driving capability, will be able to take control of driving, allowing drivers to spend their time in other activities, such as talking to other occupants, listening to song, podcasts or watching videos. When not driving, the drivers may relax by reclining their seats or talking to fellow passengers by swiveling their seat. In fully autonomous (SAE Level 5) vehicles, self-driving system will take full control of driving. With a higher level of automation there is a greater likelihood of unusual interior concept and seat configuration.

Driverless or autonomous vehicles (AVs) may be configured with a passenger compartment including one or more seats that are oriented in various directions. In some cases, the seats can be moved or swiveled from a front-facing position to a rear-facing position for when the vehicle is operating in an autonomous mode. In some other cases, the AV may include a passenger compartment in which the seats are arranged facing toward a center of the vehicle rather than all facing forwards, an arrangement also referred to as "campfire seating". It may be appreciated that such seating arrangements can also make possible the elimination of the traditional inclined A-pillar and windshield rake. Instead, as an example, both the front and the rear of an AV can include larger pillar structures, such as for housing electronics and sensors. In addition, because the pillar trim in the AV is oriented along a substantially vertical direction, the traditional door system would also be modified.

Thus, while current airbags generally achieve their intended purpose, there is a need for a new and improved airbag assembly that accommodates vehicles designed for front passengers who are oriented in the rearward facing or side-facing position in a vehicle. As will be discussed in greater detail below, in some embodiments, an airbag assembly with a tether can be configured to function in conjunction with a lid installed on a garnish of one or more pillars (or posts) of the vehicle to provide rearward-facing occupants the protection of a side airbag. In some embodiments, the lid can be configured to open in order to allow an airbag tether to deploy through, without any direct interaction or contact with the inflated airbag. The opened lid can also be configured to provide a routing surface or guided barrier to ensure the tether is in the desired orientation when the airbag is deployed.

Figure 1A:
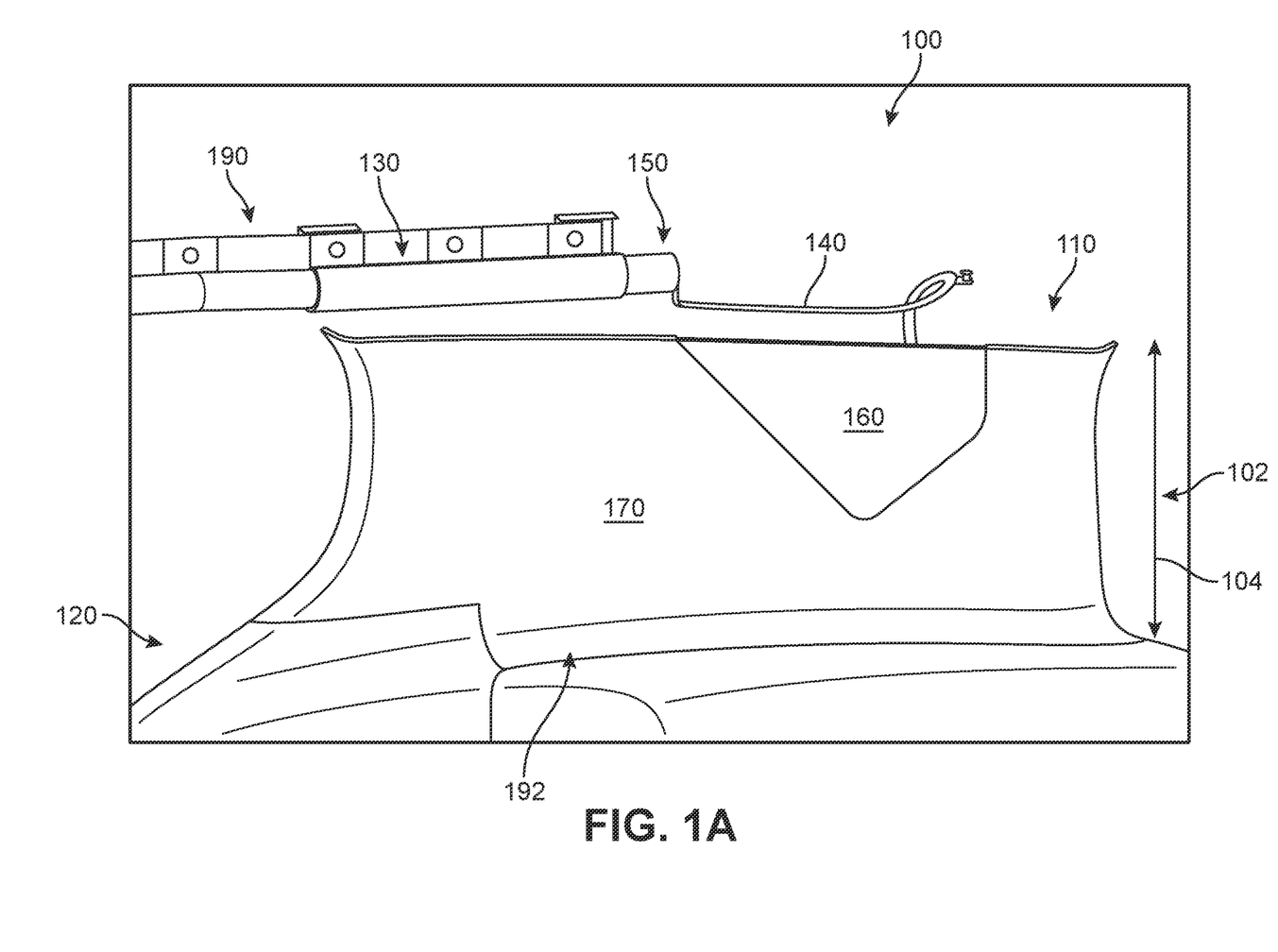
FIGS. 1A and 1B present a sequence in which a vehicle deploys an airbag, according to an embodiment.
Figure 1B:
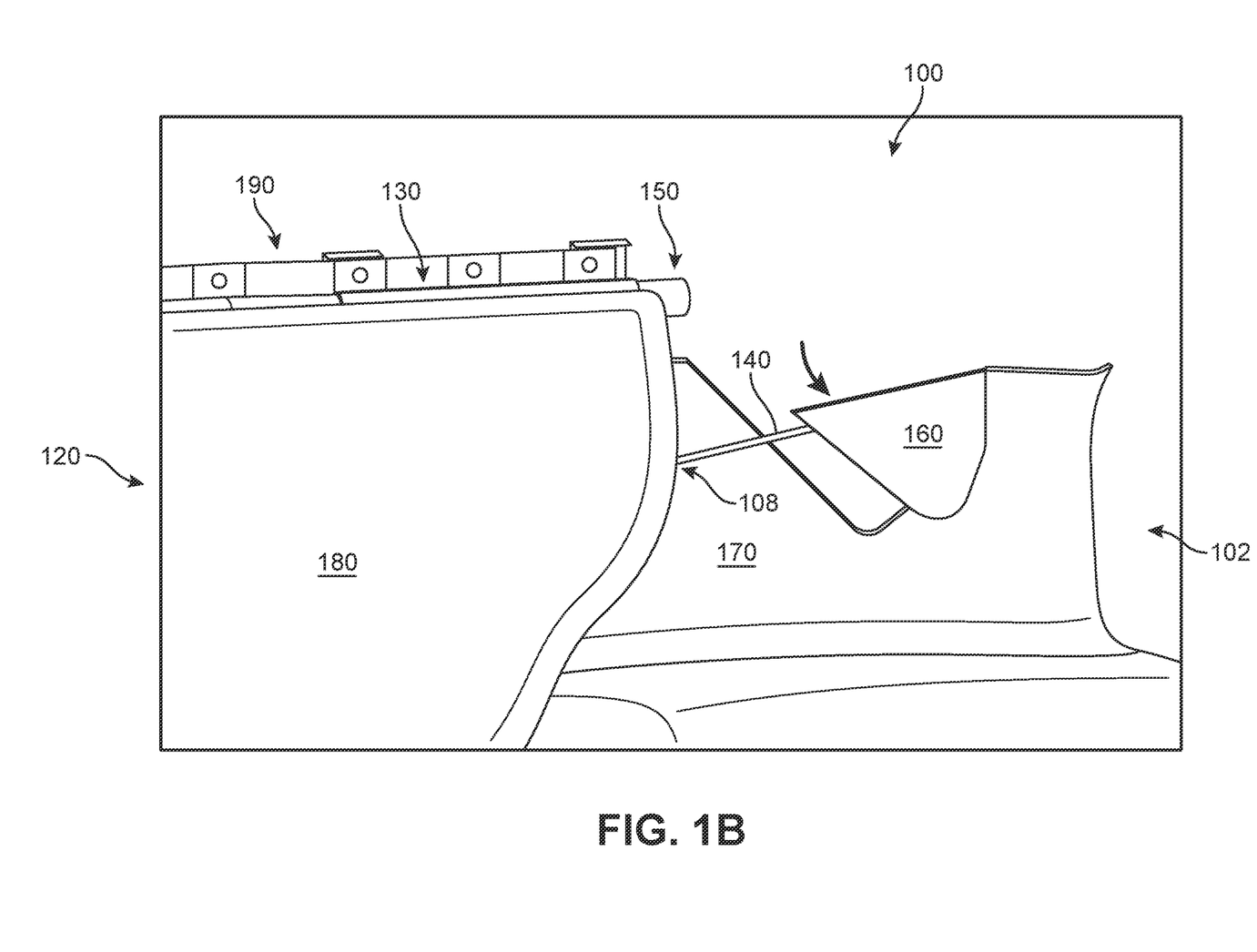

For purposes of introduction, an overview of one embodiment of the proposed systems and methods is illustrated with reference to FIGS. 1A and 1B. In FIG. 1A, an inflatable safety system 100 comprising an airbag assembly ("assembly") 150 is depicted in a first, initial, or stowed configuration 110, while in FIG. 1B the assembly 150 is depicted in a second, inflated, or deployed configuration 120. As shown in FIGS. 1A and 1B, the assembly 150 can include a roof rail compartment ("roof rail") 130 that houses, stores, or otherwise includes an airbag 180 when the assembly 150 is in the deployed configuration 120. The assembly 150 further includes a pillar garnish 170, a tether 140, and a tether panel or lid 160. In this example, for purposes of clarity, a portion of the roof and pillar have been removed to expose the arrangement of tether 140.

For purposes of this example, the vehicle in which system 100 is installed may be a driver-operated vehicle, a shared autonomous vehicle (SAV), or an autonomous vehicle (AV). In SAVs and AVs, the seating arrangement may allow the vehicle occupants to face each other. As a result, autonomous vehicles may not require components that an individual typically uses to maneuver the vehicle such as, for example, a steering wheel. Moreover, the passenger who is normally seated in the driver's seat may no longer need to be facing forwards towards the front windshield. This is because the occupant seated in the driver's seat no longer needs to view the roadways. As a result, autonomous vehicles can be equipped with flexible seating configurations that allow for the front passengers to rotate their seats into a rearward facing orientation or a side-facing orientation that may be referred to as a campfire style (or a carriage style) seating arrangement of the vehicle.

In different embodiments, the vehicle can include a plurality of pillar structures that extend from the floorplan to the roof along the sides of a vehicle. In some embodiments, a pillar structure includes a pillar frame, a pillar inner panel, and a pillar garnish which is typically fashioned as an interior decorative member or outer covering provided at a vehicle interior side. While non-autonomous vehicles include inclined, sloped, or raked windshields and A-pillars for driver convenience, it can be appreciated that autonomous vehicles need not include such inclined pillars or windshields. Thus, one or more (or all) pillars of an AV may be substantially oriented or aligned with a vertical axis 104, as is the case in FIGS. 1A and 1B with a first pillar structure 102. In other embodiments, the inflatable safety system 100 may include additional components or airbag assemblies, installed in association with this or other pillar structures of the vehicle.

In different embodiments, the assembly 150 in FIGS. 1A and 1B is installed or otherwise incorporated into a first pillar structure 102 and a roof structure 190 of a vehicle. In other words, the pillar garnish 170 is a portion of a larger first pillar 102 of the vehicle. The pillar garnish 170 is mounted on a proximal side 192 of the first pillar 102, disposed opposite to its distal side 194. For purposes of reference, a component's proximal side will refer to the side that is disposed nearer toward the center or interior of the vehicle, and the component's distal side is then disposed relatively further from the center or interior of the vehicle (e.g., in this case, toward an exterior of the vehicle).

As shown in FIG. 1A, the lid 160 is installed or otherwise disposed within a cutout region in pillar garnish 170 that is sized and dimensioned to receive the lid 160. In some embodiments, the lid 160 is configured to lie in the cutout region such that its proximal exterior surface is substantially flush with the proximal exterior surface the pillar garnish 170 in the stowed configuration 110. Additional details regarding the assembly 150 in the stowed configuration will be provided in FIG. 2.

Figure 2:
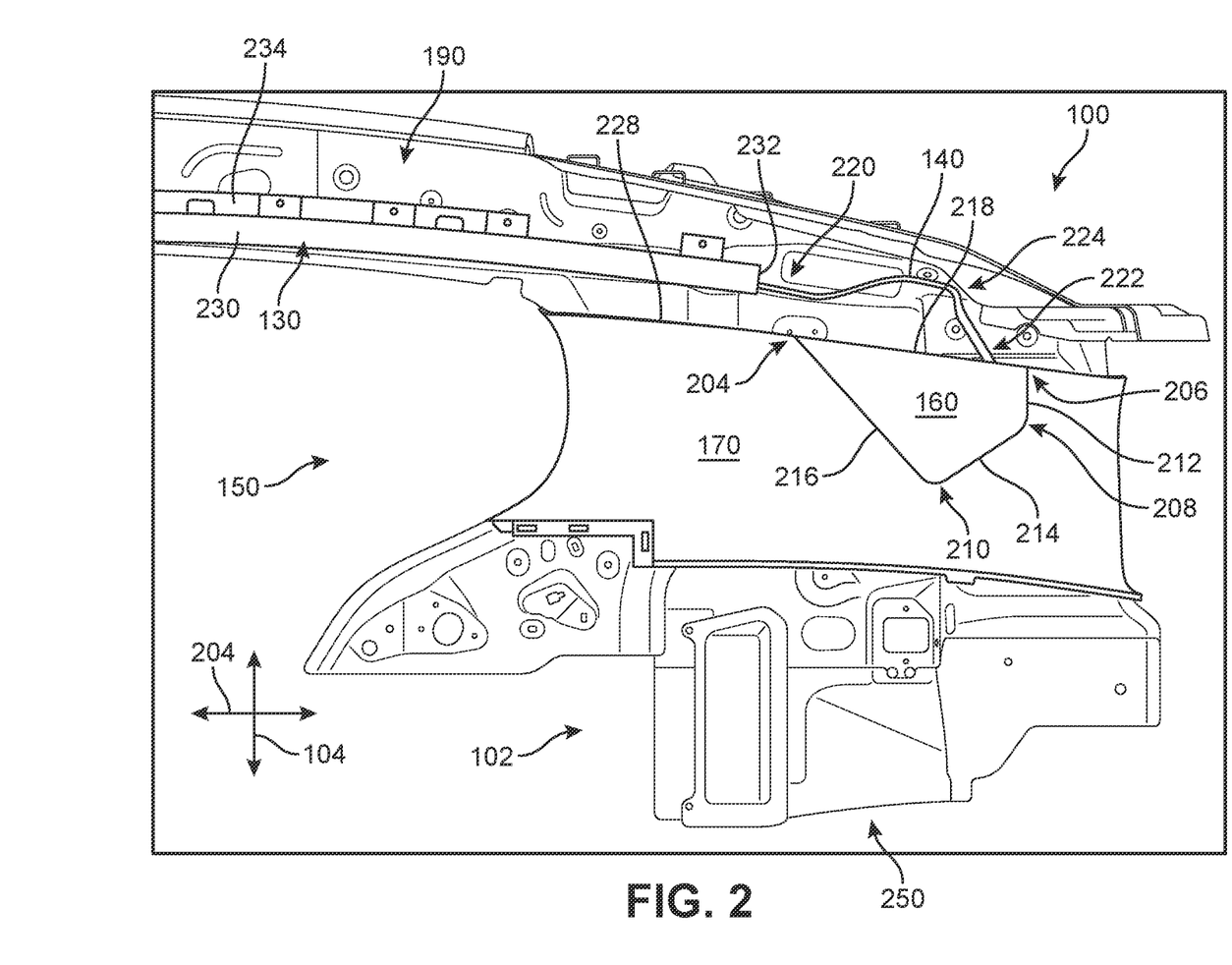
FIG. 2 is a schematic proximal-side view of an airbag assembly for a vehicle in a stowed configuration, according to an embodiment.

As shown in FIG. 1B, in different embodiments, when the airbag 180 is deployed and unfurls downward, the tether 140 may be pulled or jerked in a diagonally downward direction, whereby the tether 140 extends in a direction toward a point 180 where a first end portion of the tether 140 is secured to the airbag 180. As shown in FIG. 2, the tether 140 can be longer relative to traditional tethers in order to perform the operations described herein. As a second end portion of the tether 140 is anchored behind the lid 160, the pulling of the tether 140 further applies a pushing force against the lid 160, which further causes the lid 160 to flip or swing open. A portion of the tether 140 continues to push or press against the interior distal-facing surface of the lid 160 (see FIGS. 6 and 7). As a result, the lid 160 offers a substantially planar or flat boundary or barrier against which the tether 140 is controlled or limited in its extension as it moves with the airbag 180.

Referring now to FIG. 2, a schematic proximal side view of the assembly 150 is presented. In some embodiments, the roof rail 130 can comprise an elongated structure extending from a forward end (not shown) to a rearward end 230 that is configured to store the airbag in the stowed configuration. In FIG. 2, the roof rail 130 includes a substantially cylindrical structure 230 in which the airbag is housed, mounted to a portion of roof assembly 150 via a set of mounting portions 234. The roof rail 130 can be in fluid communication with an inflator unit (not shown). In some embodiments, a release device (not shown) can be coupled or otherwise connected to the roof rail 130 and may be in electronic communication with one or more sensors that can detect vehicle and occupant characteristics that may trigger the release of the airbag. In one embodiment, the release device may be controlled by, managed, or otherwise connected to an electronic control unit (ECU) of the vehicle.

As a general matter, in order for an airbag membrane to inflate with a predetermined shape or location, one or more tethers may be used. As the airbag expands due to the force of the inflation gas, the tether 140 can become taut and place tension on the lid 160 such that lid is pushed outward on its hinged side (in this case, in a direction toward the viewer, or a center 250 of vehicle). A tether can be configured to limit the expansion of the airbag and restrict it to a specific shape or position. For example, a tether can be attached to a surface of the airbag membrane at one end and extend to another surface of the assembly or vehicle structure. In FIG. 2, the tether 140 extends into the cylindrical structure 230 via opening 232 to attach to the airbag stowed within the cylindrical structure 230.

Figure 6:
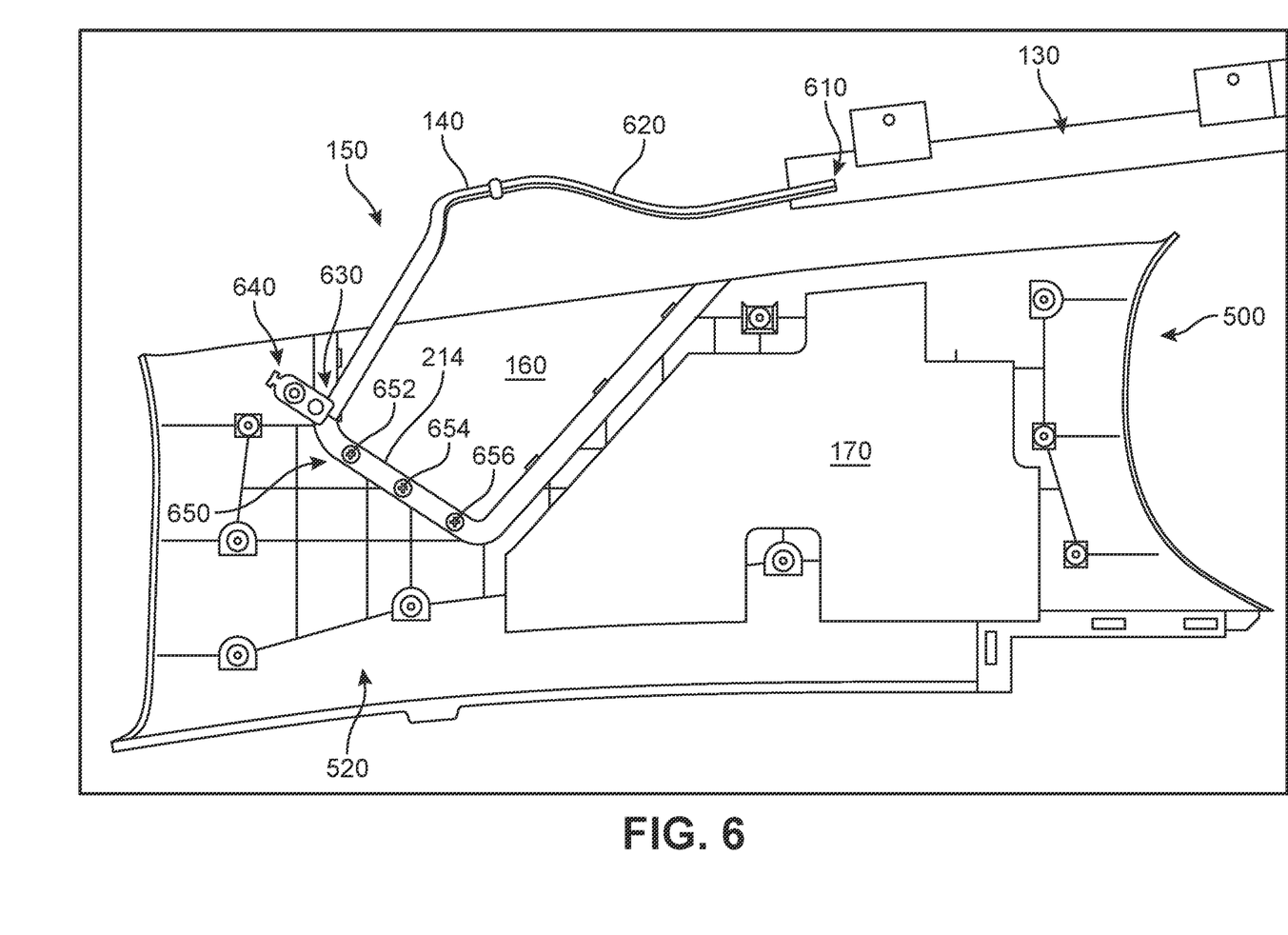
FIG. 6 is a schematic distal-side view of an airbag assembly in the stowed configuration, according to an embodiment.

In different embodiments, the tether 140 may comprise a strap or other elongated material, including but not limited to textiles and woven materials. As shown in FIG. 6, the tether 140 has a first end 610, an elongated middle portion 620, and a second end 630. The first end 610 is connected, attached, anchored, or otherwise joined to the airbag 180, the middle portion 620 extends towards the pillar structure 102, and the second end 630 is coupled to an interior region of the pillar garnish 170. Returning to FIG. 2, the tether 140 can be seen routed through a portion of the roof structure 190 until entering the interior space enclosed in part by the pillar garnish 170 and lid 160.

In different embodiments, the lid 160 can comprise a slightly flexible thermoplastic material, such as but not limited to thermoplastic olefin (TPO). In FIG. 2, the lid 160 can be seen to comprise a four-sided shape, including a first side 212, a second side 214, a third side 216, and a fourth side 218. When the lid 160 is in the stowed configuration, the first side 212 is substantially aligned with vertical axis 104, and fourth side 218 is generally aligned with a horizontal axis 204. In addition, in some embodiments, fourth side 218 is joined to an upper periphery 228 of pillar garnish 170, providing a substantially continuous and smooth upper edge surface. The first side 212 and fourth side 218 meet at a nearly orthogonal intersection or first corner region 206, and the fourth side 218 and third side 216 meet to form an acute intersection or second corner region 204. The second side 214 and third side 216 are diagonal relative to the vertical axis 104 and join together at a first rounded corner region 210. Similarly, first side 212 and second side 214 are joined together at a second rounded corner region 208.

Figure 3:
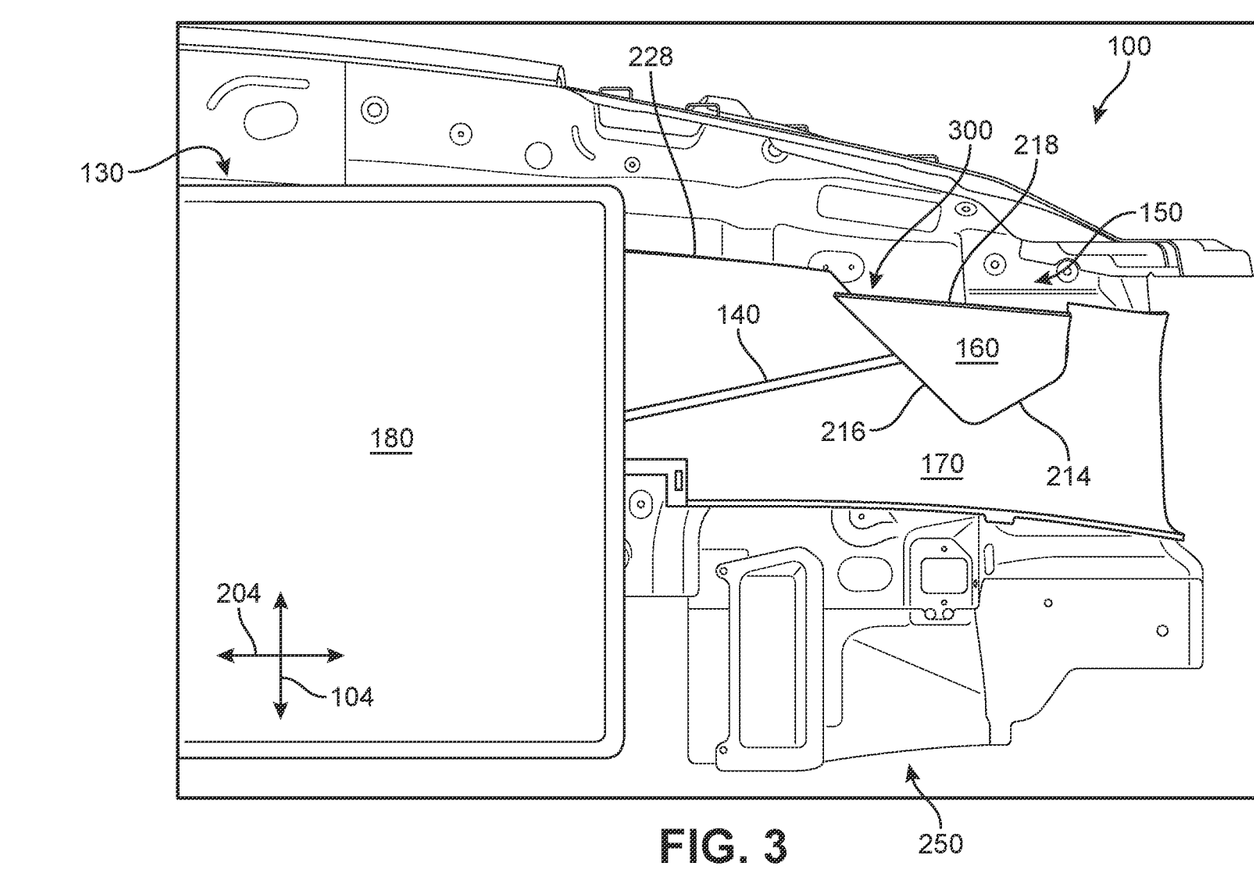
FIG. 3 is a schematic proximal-side view of an airbag assembly for a vehicle in a deployed configuration, according to an embodiment.
Figure 4:
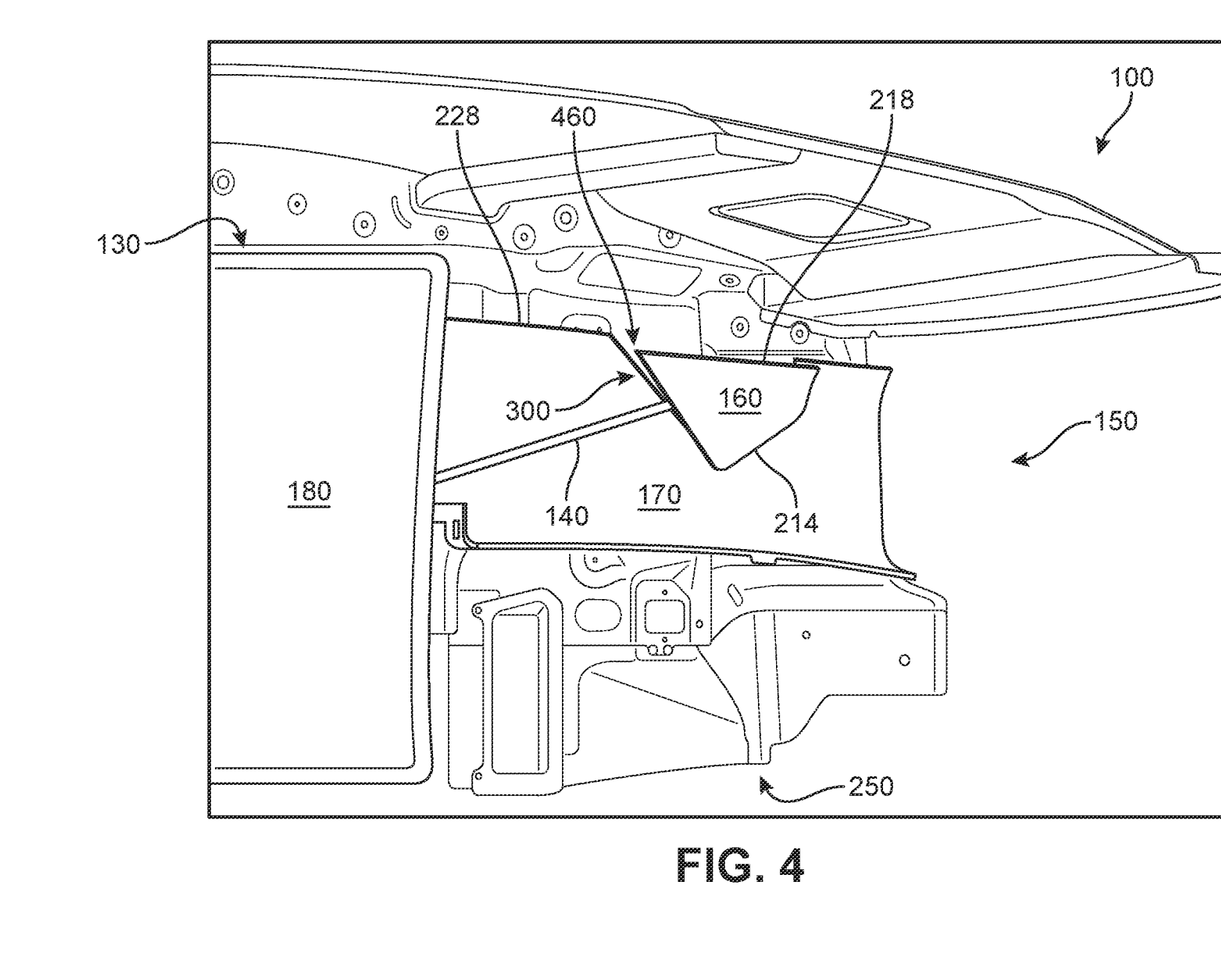
FIG. 4 is a schematic perspective view of an airbag assembly for a vehicle in a deployed configuration, according to an embodiment.

As illustrated in FIG. 3, in some embodiments, the second side 214 is associated with a hinge mechanism that allows the lid 160 to flip or swing open (in a direction toward the center 250 of the vehicle, typically where passengers would be seated), the smooth action of which is further facilitated by the rounded corner regions. Furthermore, the tether 140 exits the interior of the pillar structure via an opening or gap 300 between the surfaces lid 160 and pillar garnish 170, no longer flush with respect to one another. The gap 300 is more clearly observed in the perspective view of the assembly 150 in FIG. 4, where the lid 160 and pillar garnish 170 are shown separated by a space 460. Tether 140 emerges taut through gap 300 and extends to airbag 180 while also pushing against the lid 160 in a direction generally toward center 250.

It may be appreciated that the specific orientation of the lid 160 in the pillar garnish 170 and of each of its sides ensures that the lid 160 opens to a pose that controls the release of the tether 140 as needed for the deployment of the airbag. In some embodiments, the hinge mechanism ensures that the lid 160 opening is limited to a predetermined distance, thereby providing the required boundary or routing guidance to the tether 140. Furthermore, it should be understood that the specific shape of lid 160 is based on a probable tether deployment zone for a vehicle. Thus, in other embodiments, the shape of the lid 160 may vary. In general, the shape of the lid will correspond to a shape that allows the tether to open the lid with a purely downward force and trajectory in the given vehicle. As the lid shape and size will be dependent on the tether deployment zone, once the tether is in position, there is no interference between the lid and the tether to prevent proper positioning.

Figure 5A:
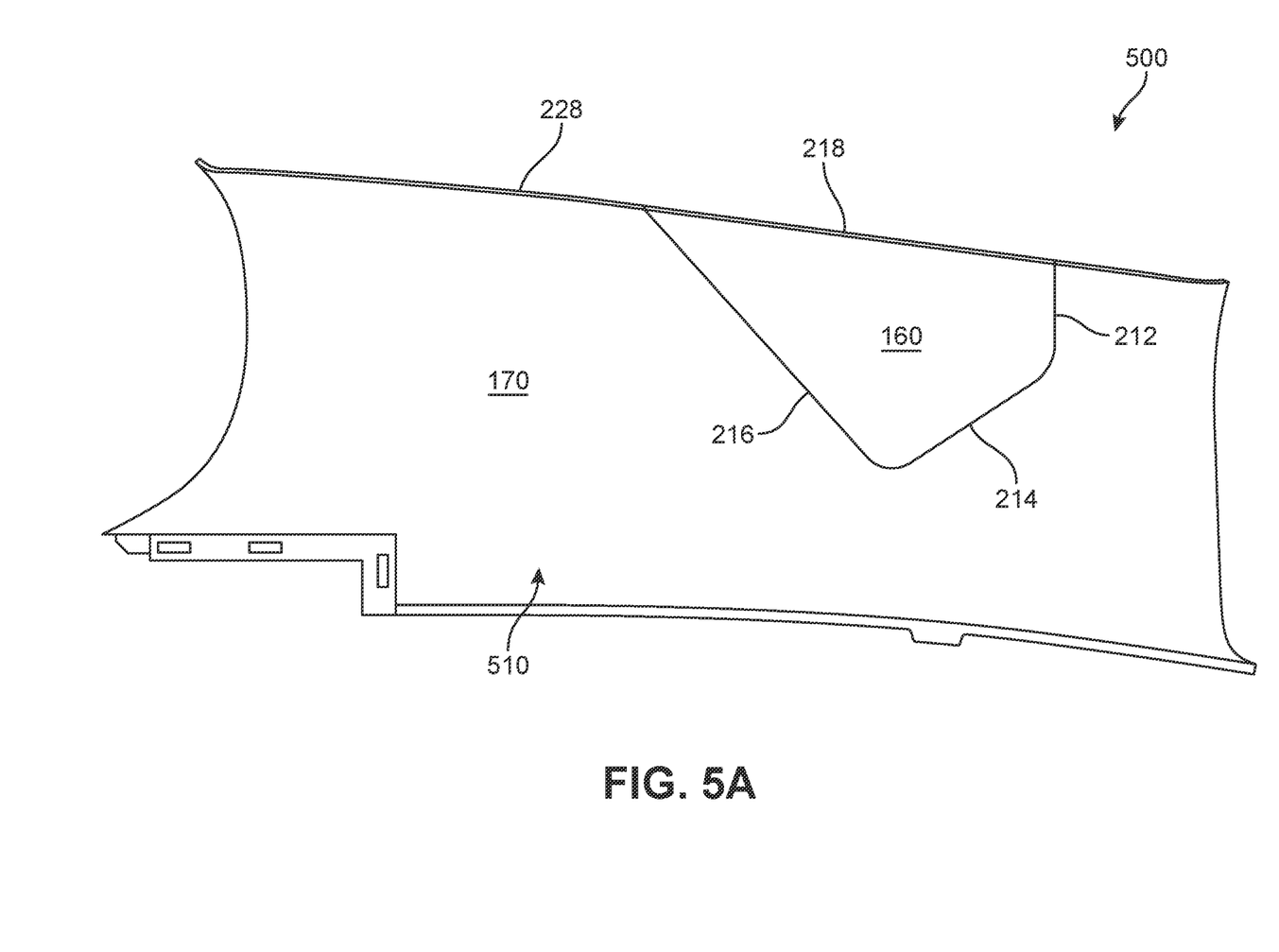
FIG. 5A presents an exterior (proximal) side of a lid and pillar garnish and FIG. 5B presents an interior side (distal) side of a lid and pillar garnish.
Figure 5B:
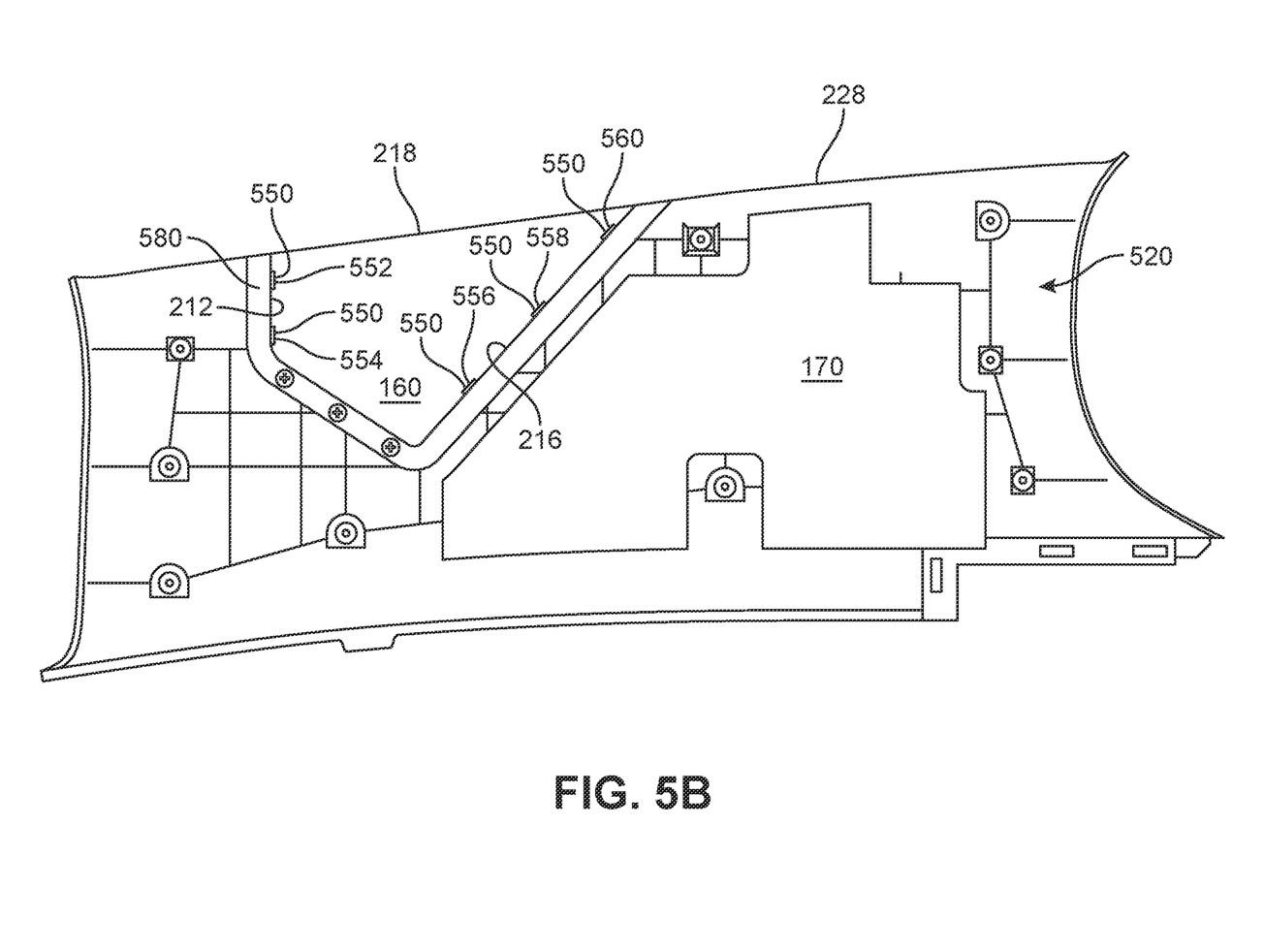

For purposes of clarity, a panel comprising the pillar garnish 170 and lid 160 is presented in isolation in FIGS. 5A and 5B while in the stowed configuration. In FIG. 5A, a proximally-facing exterior side 510 is shown, and in FIG. 5B, the panel 500 has been flipped to present a distally-facing interior side 520. As shown in FIG. 5B, the interior side 520 of the pillar garnish 170 includes a mounting frame 580 to which the lid 160 is joined or connected. The mounting frame 580 includes three sides that are sized and dimensioned to align with and receive the three sides (212, 214, and 216) of the lid 160. Along the two diagonally-oriented sides (first side 212 and third side 216), the lid 160 is detachably retained to the mounting frame 580 by a plurality of tab portions 550 in order to provide a flush seam between the lid 160 and surrounding pillar garnish 170. In FIG. 5B, there are five tab portions 550, though in other embodiments, there may be fewer or a greater number, and/or the tab portions may be disposed on only one side, and/or also on the second side 214. In some embodiments, the tab portions 550 are molded onto the components, and are designed to break away or detach upon deployment of the airbag to permit the lid 160 to swing outward. As shown in FIG. 5B, a first tab 552 and a second tab 554 retain the first side 212 of the lid 160, while a third tab 556, a fourth tab 558, and a fifth tab 560 retain the relatively longer third side 216. When the airbag is deployed, the tether will dominantly be projected straight downward and push open the lid 160, exerting pressure on the lid 160 and breaking the tabs. Thus, it can be appreciated that the force of the tether, rather than the airbag, pushes the lid outward.

Referring now to FIG. 6, the assembly 150 is presented from the same view as FIG. 5B, where interior side 520 of panel 500 can be seen. The tether 140 and roof rail 130 are also illustrated in FIG. 6 in the stowed configuration. In one embodiment, a substantial portion or all of the middle portion 620 of tether 140 remains distal relative to the pillar garnish 170 and lid 160 in the stowed configuration. As noted earlier, tether 140 extends from first end 610 (joined to the airbag) to a second end 630. An anchoring or mounting element 640 for the second end 630 can now be observed, which fixedly holds the second end 630 in place during both the stowed configuration and deployed configuration. More specifically, the tether 140 is mounted to the pillar garnish 170 rather than the roof structure, substantially reducing the risk of detaching the roof-liner during airbag deployment.

FIG. 6 also illustrates the routing of the tether 140 relative to the other components of the assembly 150. As shown in FIG. 6, the tether 140 is installed just behind and adjacent to the lid 160. In some embodiments, the mounting element 640 includes a metal loop that is joined directly to the body structure on the interior side of the pillar garnish 170. In one embodiment, the lid 160 covers the entirety of the loop mount as well as the tether trajectory so that the tether cannot become stuck at any point along the pillar garnish 170. In different embodiments, the assembly 150 can also include a sacrificial tree mount (e.g., a plastic clip) on the roof to help guide the static tether above and over the garnish into deployment position. This mount is configured to tear or break away during deployment, as it is designed to guide the tether in the right direction. In FIG. 6, the tether 140 is routed from the pillar garnish 170 upward, crossing directly over and above lid 160. In some embodiments, this routing is held substantially static with the support of the sacrificial tree clip.

As noted earlier, the lid 160 may be fixedly joined along one side to the pillar garnish 170. For example, in some embodiments, the lid 160 may welded to the pillar garnish 170. In the embodiment of FIG. 6, the second side 214 of lid 160 has been sonically welded at a plurality of weld points 650 in order to provide a connection strong enough to withstand the push force of the tether 140 when the airbag is deployed while also remaining flexible enough to pivot about the hinge axis of second side 214 or otherwise bend easily during airbag deployment. In this case, there are three weld points 650 including a first weld point 652, a second weld point 654, and a third weld point 656. In some embodiments, the points are spaced apart at approximately equal distance from one another. In other embodiments, there may be fewer or a greater number of weld points.

Figure 7:
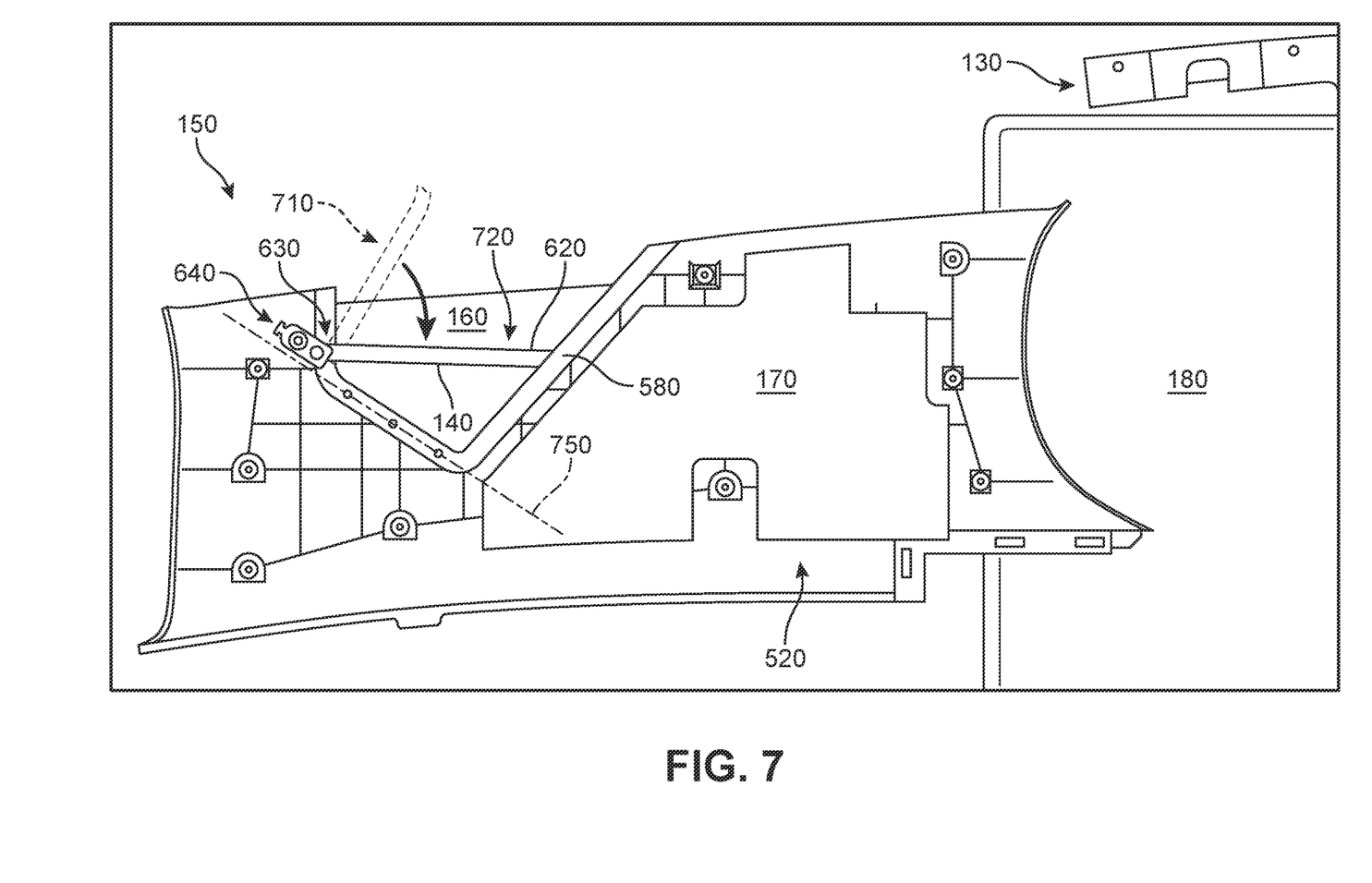
FIG. 7 is a schematic distal-side view of an airbag assembly in the deployed configuration, according to an embodiment.

The transition from the stowed configuration of FIG. 6 to the deployed configuration is presented in FIG. 7. When the airbag assembly is triggered and the airbag 180 inflated, the tether 140 is dragged immediately downward and against of the lid 160. The lid is oriented to allow for a rapid, successful opening that is configured to ensure the tether deploys into position quickly and without interference. Once the airbag 180 is fully inflated, the tether 140 is configured to extend to its maximum tension in order to protect occupants. The lid 160 remains open and is not hindering the tether in any way when in the deployed configuration.

For purposes of comparison, a first position or stowed path 710 of the tether 140 is presented in phantom (dotted lines), and a second position or deployed path 720 of the same tether 140 is shown in solid line. In FIG. 7, the tether 140 has shifted downward, pivoting about mounting element 640. The tether 140 now extends directly across a distal-facing surface of the lid 160, pressing against the surface and causing tabs to break, thereby releasing the lid and allowing it to swing open along a welded hinge axis 750. Thus, in the deployed configuration, a substantial portion or nearly all of the middle portion 620 of tether 140 is now proximal relative to the pillar garnish 170.

Figure 8:
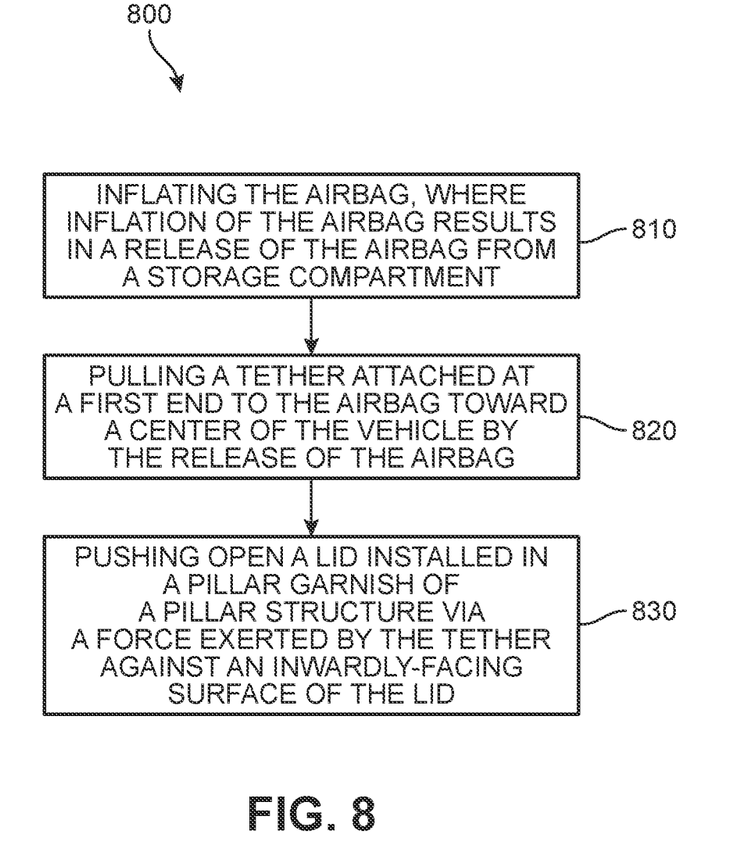
FIG. 8 is a flow diagram of a process of deploying an airbag, according to an embodiment.

FIG. 8 is a flow chart illustrating an embodiment of a method 800 of deploying an airbag in a vehicle. The method 800 includes a first step 810 of inflating the airbag, where inflation of the airbag results in a release of the airbag from a storage compartment. A second step 820 includes pulling a tether attached at a first end to the airbag toward a center of the vehicle by the release of the airbag. In addition, a third step 830 includes pushing open a lid installed in a pillar garnish of a pillar by a force exerted by the tether against an inwardly-facing surface of the lid.

In other embodiments, the method may include additional steps or aspects. As one example, a second end of the tether may be attached to an interior surface of the pillar garnish. In another example, the lid can be welded along a first side to the pillar garnish, thereby providing a hinge mechanism along which the lid swings. In some embodiments, the lid is joined to the pillar garnish along two sides by a plurality of molded clip tabs that are configured to break away when the tether pushes against the inwardly-facing surface of the lid. In some examples, the tether is disposed both within the pillar structure and outside of the pillar structure when the airbag is deployed.

As another example, the proposed embodiments can include an inflatable airbag assembly for a vehicle. The assembly can comprise a tether and a lid installed in a pillar garnish of a pillar structure of the vehicle. The tether has a first end and a second end, where the first end is attached to a mounting element anchored to an interior surface of the pillar garnish and the second end is attached to an airbag. In addition, the lid is configured to remain spaced apart from the airbag during deployment of the airbag. In some embodiments, the airbag is stowed in a roof rail of the vehicle. In one embodiment, the pillar garnish is a quarter trim garnish. In some cases, the mounting element is disposed directly adjacent to the lid. In another example, the pillar structure is oriented in a direction that is substantially aligned with a vertical axis of the vehicle, or is orthogonal to a horizontal axis. In some embodiments, the lid comprises a flexible thermoplastic material. In one example, the tether exerts a pushing force against the lid in a proximal direction when the airbag is deployed. In another example, the airbag assembly is configured for use in a vehicle in which one or more pillar structures extend along a vertical direction (i.e., have a central axis that is aligned with the vertical axis). In some embodiments, the interior surface of the pillar garnish further includes a plurality of tabs configured to retain the lid in a closed state (i.e., flush with the surrounding pillar garnish proximal-facing surface) when the airbag is stowed. In one embodiment, the tabs are configured to break when the airbag is deployed, enabling or permitting the lid to open.

As another example, the proposed embodiments can include a vehicle comprising a roof rail mounted on a roof of the vehicle. The roof rail includes or houses an airbag. In addition, the vehicle includes a pillar structure oriented along a substantially vertical axis, a pillar garnish mounted on a portion of the pillar structure, a tether connecting the airbag (at a first tether end) to an interior (distal-facing) surface of the pillar garnish (at a second tether end), and a lid installed in the pillar garnish, the lid being configured to open along a first hinge axis adjacent to the second tether end when the airbag is deployed. In some cases, the orientation of the tether when the airbag is deployed is controlled at least in part by the opened lid. In one embodiment, the vehicle also includes a passenger compartment including a plurality of seats arranged to face toward a center of the vehicle. In another embodiment, the tether extends in a diagonally downward direction across an exterior (distal-facing) surface of the pillar garnish when the airbag is deployed. In another example, the second tether end is anchored to the interior (distal facing) surface of the pillar garnish by a loop mount, and the tether is configured to pivot on the loop mount.

The following includes definitions of selected terms employed herein. The definitions include various examples and/or forms of components that fall within the scope of a term and that can be used for implementation. The examples are not intended to be limiting. Aspects of the present disclosure can be implemented using hardware, software, or a combination thereof and can be implemented in one or more computer systems or other processing systems. In one example variation, aspects described herein can be directed toward one or more computer systems capable of carrying out the functionality described herein. An example of such a computer system includes one or more processors. A "processor", as used herein, generally processes signals and performs general computing and arithmetic functions. Signals processed by the processor may include digital signals, data signals, computer instructions, processor instructions, messages, a bit, a bit stream, or other means that may be received, transmitted and/or detected. Generally, the processor may be a variety of various processors including multiple single and multicore processors and co-processors and other multiple single and multicore processor and co-processor architectures. The processor may include various modules to execute various functions.

The apparatus and methods described herein and illustrated in the accompanying drawings by various blocks, modules, components, circuits, steps, processes, algorithms, etc. (collectively referred to as "elements") can be implemented using electronic hardware, computer software, or any combination thereof. Whether such elements are implemented as hardware or software depends upon the particular application and design constraints imposed on the overall system. By way of example, an element, or any portion of an element, or any combination of elements can be implemented with a "processing system" that includes one or more processors. One or more processors in the processing system can execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more aspects, the functions described can be implemented in hardware, software, firmware, or any combination thereof. If implemented in software, the functions can be stored on or encoded as one or more instructions or code on a computer-readable medium. Computer-readable media includes computer storage media. Storage media can be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer.

The processor can be connected to a communication infrastructure (e.g., a communications bus, cross-over bar, or network). Various software aspects are described in terms of this example computer system. After reading this description, it will become apparent to a person skilled in the relevant art(s) how to implement aspects described herein using other computer systems and/or architectures.

Computer system can include a display interface that forwards graphics, text, and other data from the communication infrastructure (or from a frame buffer) for display on a display unit. Display unit can include display, in one example. Computer system also includes a main memory, e.g., random access memory (RAM), and can also include a secondary memory. The secondary memory can include, e.g., a hard disk drive and/or a removable storage drive, representing a floppy disk drive, a magnetic tape drive, an optical disk drive, etc. The removable storage drive reads from and/or writes to a removable storage module in a well-known manner. Removable storage module, represents a floppy disk, magnetic tape, optical disk, etc., which is read by and written to removable storage drive. As will be appreciated, the removable storage module includes a computer usable storage medium having stored therein computer software and/or data.

Computer system can also include a communications interface. Communications interface allows software and data to be transferred between computer system and external devices. Examples of communications interface can include a modem, a network interface (such as an Ethernet card), a communications port, a Personal Computer Memory Card International Association (PCMCIA) slot and card, etc. Software and data transferred via communications interface are in the form of signals, which can be electronic, electromagnetic, optical or other signals capable of being received by communications interface. These signals are provided to communications interface via a communications path (e.g., channel). This path carries signals and can be implemented using wire or cable, fiber optics, a telephone line, a cellular link, a radio frequency (RF) link and/or other communications channels. The terms "computer program medium" and "computer usable medium" are used to refer generally to media such as a removable storage drive, a hard disk installed in a hard disk drive, and/or signals. These computer program products provide software to the computer system. Aspects described herein can be directed to such computer program products. Communications device can include communications interface.

Computer programs (also referred to as computer control logic) are stored in main memory and/or secondary memory. Computer programs can also be received via communications interface. Such computer programs, when executed, enable the computer system to perform various features in accordance with aspects described herein. In particular, the computer programs, when executed, enable the processor to perform such features. Accordingly, such computer programs represent controllers of the computer system.

In variations where aspects described herein are implemented using software, the software can be stored in a computer program product and loaded into computer system using removable storage drive, hard disk drive, or communications interface. The control logic (software), when executed by the processor, causes the processor to perform the functions in accordance with aspects described herein. In another variation, aspects are implemented primarily in hardware using, e.g., hardware components, such as application specific integrated circuits (ASICs). Implementation of the hardware state machine so as to perform the functions described herein will be apparent to persons skilled in the relevant art(s). In yet another example variation, aspects described herein are implemented using a combination of both hardware and software.

The foregoing disclosure of the preferred embodiments has been presented for purposes of illustration and description. It is not intended to be exhaustive or to limit the embodiments to the precise forms disclosed. Many variations and modifications of the embodiments described herein will be apparent to one of ordinary skill in the art in light of the above disclosure.

While various embodiments have been described, the description is intended to be exemplary, rather than limiting, and it will be apparent to those of ordinary skill in the art that many more embodiments and implementations are possible that are within the scope of the embodiments. Any feature of any embodiment may be used in combination with or substituted for any other feature or element in any other embodiment unless specifically restricted. Accordingly, the embodiments are not to be restricted except in light of the attached claims and their equivalents. Also, various modifications and changes may be made within the scope of the attached claims.

Further, in describing representative embodiments, the specification may have presented a method and/or process as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process should not be limited to the performance of their steps in the order written, and one skilled in the art can readily appreciate that the sequences may be varied and still remain within the spirit and scope of the present embodiments.

The invention claimed is:

1. An inflatable airbag assembly for a vehicle comprising:
a lid installed in a pillar garnish of a pillar structure of the vehicle; and
a tether with a first end and a second end, the first end attached to a mounting element anchored directly to an interior surface of the pillar garnish and the second end attached to an airbag;
wherein the lid is configured to remain spaced apart from the airbag during deployment of the airbag, and the mounting element is disposed directly adjacent to the lid.

2. The airbag assembly of claim 1, wherein the airbag is stowed in a roof rail compartment of the vehicle.

3. The airbag assembly of claim 1, wherein the pillar garnish is a quarter trim garnish.

4. The airbag assembly of claim 1, wherein the tether causes the lid to flip open by exerting a pushing force against the lid when the airbag is being deployed.

5. The airbag assembly of claim 1, wherein the pillar structure is oriented in a direction that is aligned with a vertical axis of the vehicle.

6. The airbag assembly of claim 1, wherein the lid comprises a flexible thermoplastic material.

7. The airbag assembly of claim 1, wherein the tether is configured to restrict the airbag to a specific shape or position.

8. The airbag assembly of claim 1, wherein the airbag assembly is configured for use in a vehicle in which one or more pillar structures extend along a vertical direction.

9. The airbag assembly of claim 1, wherein the interior surface further includes a plurality of tabs configured to retain the lid in a closed state when the airbag is stowed.

10. The airbag assembly of claim 9, wherein the plurality of tabs are configured to break when the airbag is deployed, enabling the lid to open.

11. An inflatable airbag assembly for a vehicle comprising:
a lid installed in a pillar garnish of a pillar structure of the vehicle; and
a tether with a first end and a second end, the first end attached to a mounting element anchored directly to an interior surface of the pillar garnish and the second end attached to an airbag;
wherein the lid is configured to remain spaced apart from the airbag and the tether presses against an interior surface of the lid when the airbag is inflated.

12. The airbag assembly of claim 11, wherein the airbag is stowed in a roof rail compartment of the vehicle.

13. The airbag assembly of claim 11, wherein the pillar garnish is a quarter trim garnish.

14. The airbag assembly of claim 11, wherein the mounting element is disposed directly adjacent to the lid.

15. The airbag assembly of claim 11, wherein the pillar structure is oriented in a direction that is aligned with a vertical axis of the vehicle.

16. The airbag assembly of claim 11, wherein the lid comprises a flexible thermoplastic material.

17. The airbag assembly of claim 11, wherein the lid provides a barrier against the tether such that the tether is limited in extension as the airbag is inflated.

18. The airbag assembly of claim 11, wherein the airbag assembly is configured for use in a vehicle in which one or more pillar structures extend along a vertical direction.

19. The airbag assembly of claim 11, wherein the interior surface of the pillar garnish further includes a plurality of tabs configured to retain the lid in a closed state when the airbag is stowed.

20. The airbag assembly of claim 19, wherein the plurality of tabs are configured to break when the airbag is deployed, enabling the lid to open.

* * * * *